Aug. 28, 1962 J. SIMON ET AL 3,051,943

HEAD FOR VARIABLE RELUCTANCE CONVERTER

Filed Sept. 2, 1959

INVENTORS
WILLIAM E. POLLOCK
JOSEPH SIMON

BY

ATTORNEY

United States Patent Office 3,051,943

Patented Aug. 28, 1962

3,051,943

HEAD FOR VARIABLE RELUCTANCE CONVERTER

Joseph Simon, North Hollywood, and William E. Pollock, Sun Valley, Calif., assignors to General Precision, Inc., a corporation of Delaware Filed Sept. 2, 1959, Ser. No. 837,712

8 Claims. (Cl. 340—347)

This invention relates to an improved magnetic readout head and more particularly to a novel and improved magnetic readout head having a plurality of spaced sensing members for use in conjunction with a coded information member, such as those used in a variable reluctance analog-to-digital converter for reading the binary number thereon.

Numerous analog-to-digital converters have been utilized including photoelectric and electrical brush contact converters. However, these converters are limited to relatively low slew speeds and low repetition rates for readout. Furthermore, the photoelectric converters providing very low signal level are expensive and require high maintenance. Electrical brush contact converters are subject to wear, require careful maintenance and frequent replacement of brushes to maintain the close tolerances required, and the brushes tend to bounce and chatter at high speeds.

A "Variable Reluctance Converter" disclosed in copending application of Joseph Simon, SN 791,430, filed February 5, 1959, overcomes many of the disadvantages of the photoelectric and brush type converters by utilizing magnetic readout heads and associated circuitry which detects the variation in reluctance of a magnetic circuit through a coded disk having a plurality of tracks with alternate segments having different magnetic characteristics, such as alternate raised and recessed portions of different magnetic permeability.

One specific embodiment of the present invention consists essentially of a novel and improved magnetic readout head which may be utilized in conjunction with a coded disk, such as the one illustrated in the co-pending application mentioned supra, or with any other suitable coded information member.

In one preferred embodiment, a plurality of spaced sensing members or readout elements are provided by integrally forming a plurality of cylindrical fingers in concentric cylindrical recesses in a solid block of "ferrite" or other suitable magnetic material having high permeability thus providing an annular return path of approximately 360° for the flux generated by a coil wound around each finger. A small diameter opening is preferably provided from the back face of the block into the cylindrical recess to lead out the wires of the coil. Any suitable circuitry for detecting the variation in reluctance and reading out the information on the coded disk may be utilized, such as that disclosed in the co-pending application of Joseph Simon mentioned supra. It will be apparent that each of the sensing members may be separately formed in a cylindrical unit having a cylindrical recess and coaxial fingers within the recess which may be individually mounted in spaced bores in a mounting block.

One object of the present invention is to provide an improved magnetic readout head which has a substantially 360° annular return path for the magnetic flux generated by a coil wound around a sensing member mounted in or formed in the head.

Other objects and advantages of the present invention will be apparent from the following specification and claims taken in conjunction with the drawings wherein:

FIGURE 1 is a plan view illustrating one preferred form of the magnetic readout head of the present invention mounted in proximity to a coded disk for relative rotation there-between;

FIGURE 2 is a bottom plan view of the magnetic readout head with one particular spacing arrangement for use with the coded disk of FIGURE 1.

Figures 1, 2:
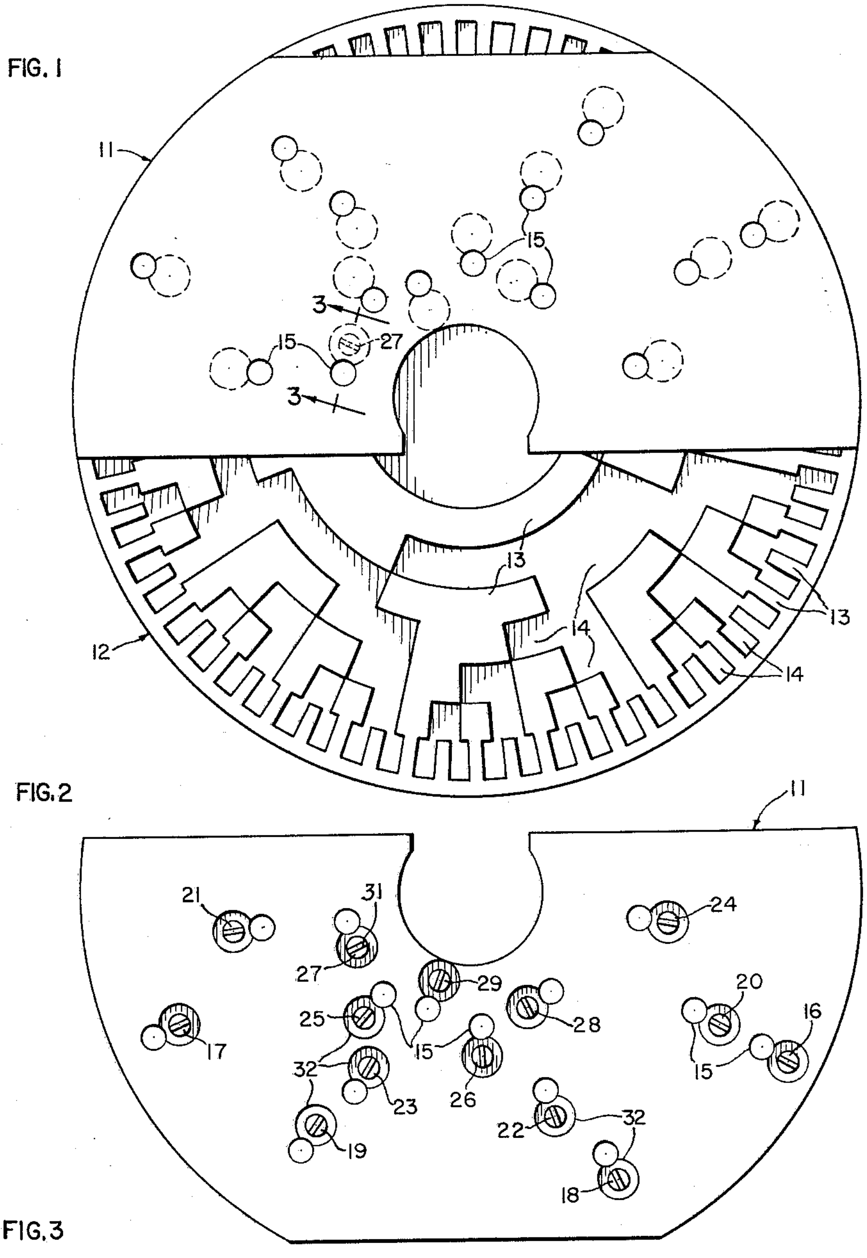

Referring now to the drawings in detail and more particularly to FIGURE 1, a magnetic readout head 11 is illustrated in FIGURE 1 with its bottom surface in proximity to and in closely spaced relation to the coded surface of an information member, such as the disk 12.

The disk 12 is preferably formed of "ferrite" or similar material and is coded by providing a plurality of tracks with alternate raised segments 13 and recessed segments 14 in each track.

The magnetic readout head 11 is preferably integrally formed of "ferrite" or some similar magnetic material having high permeability and low reluctance to the flux in the magnetic circuit. A plurality of small openings 15 are provided extending through the top of the block 11, as shown in FIGURE 1, for introducing the wires through the top of the head to the coils around the sensing members or fingers 16 through 29.

These sensing members are preferably spaced as far apart as possible in the block 11, which may be a complete circular disk, a segment of a circular disk or any other desired shape, to prevent crosstalk due to stray magnetic flux in the block.

One of the sensing members 16 is positioned in proximity to the outer track on the disk 12 which indicates the binary number of least digital significance. The two sensing members 17 and 18 are positioned in proximity to the track of next digital significance on the disk 12 and the pairs of sensing members 19 and 20, 21 and 22, 23 and 24, 25 and 26 and 27 and 28 are associated with corresponding tracks of increasing digital significance on the disk 12. The other sensing member 29 is positioned adjacent a recessed circular track to provide a reference voltage for the other sensing members. The specific arrangement of sensing members and tracks is one of many to provide a selective reading of leading and lagging members and prevent ambiguity of reading.

Figure 3:
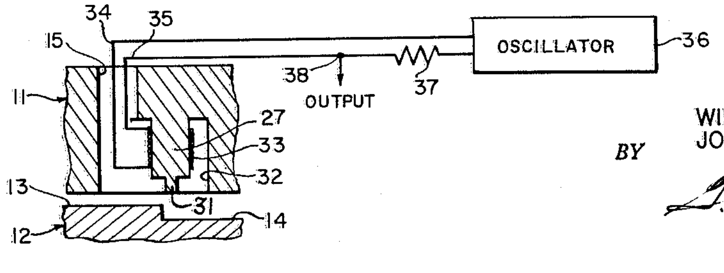
FIGURE 3 is a detailed sectional view of a portion of the magnetic readout head of FIGURES 1 and 2 on an enlarged scale taken along the line 3—3 of FIGURE 1.

Each of the sensing members 16 through 29 may be formed in the same manner as illustrated in FIGURE 3 on an enlarged scale which is a sectional view taken through one of the sensing members 27 on the line 3—3 of FIGURE 1. The cylindrical finger or sensing member 27 is provided with a thin tip 31 which preferably extends in a radial direction with respect to the disk 12 to improve the resolution and readout characteristics of the sensing member by providing a narrow line of demarcation between the high and low voltage levels corresponding to the raised and recessed segments of the tracks on the disk 12. The finger 27 is concentrically positioned within a cylindrical recess 32 formed in the bottom side of the block 11. Each of the fingers, such as the finger 27 is wound with a coil of fine wire 33 with the leads 34 and 35 from the coil 33 being brought out through the corresponding opening 15 in the top of the block 11.

The coils 33 for each of the sensing members may be connected to any suitable detecting and readout circuitry, such as that disclosed in the co-pending application of Joseph Simon mentioned supra, and one such means for detecting the variation in reluctance caused by the difference in the air gap or permeability of the alternate segments on the disk 12 is indicated schematically in FIGURE 3, wherein an oscillator 36 is connected across the coil 33 and a resistance 37 to provide an output from the junction point 38 in the form of a voltage which will vary in accordance with the reluctance of the flux path in the magnetic circuit through the finger 27, the disk 12, the return path through the "ferrite" block 11 and the variable air gap between the block 11 and the disk 12.

It will be apparent that the improved magnetic readout head of the present invention consisting of a block of "ferrite" or similar magnetic material with a plurality of spaced fingers or sensing members formed therein may be utilized in conjunction with a coded disk which is rotated to different angular positions representing a quantity in angular form or with any other information member which may be in the form of a cylinder or a linear element moved relative to the magnetic readout head and may have any type of information coded thereon by means of alternate segments or areas having different magnetic characteristics.

While the fingers or sensing members have been illustrated as integrally formed in a solid block of "ferrite," it will be apparent that a plurality of units similar to the portion illustrated in FIGURE 3 may be separately formed and mounted in a supporting head made of another material since the flux return path will be concentrated in the peripheral portion of the "ferrite" surrounding the recess 32.

We claim:

1. A magnetic readout head comprising a block of high permeability material having a plurality of recesses therein and a plurality of openings extending from an opposite face in said block into each of said recesses, and a plurality of fingers, each of said fingers being integrally formed in said block and mounted concentrically within a separate one of said recesses.

2. A magnetic readout head comprising a block of high permeability material having a plurality of cylindrical recesses in one face thereof and a plurality of openings extending from an opposite face of said block into each of said recesses, and a plurality of cylindrical fingers integrally formed concentrically within said cylindrical recesses.

3. A variable reluctance converter comprising a coded information member having alternate segments on one surface of different magnetic properties, a magnetic readout head having a plurality of spaced sensing elements formed of high permeability material, each of said sensing elements including a recess with a finger formed therein, the end portions of said sensing elements being positioned in close proximity to said surface, said information member and said head being mounted for relative movement therebetween, means including a coil wound around said finger for generating flux in a magnetic circuit through said finger and the adjacent segment on said member and the peripheral portion of said head surrounding said finger for deriving an output which varies in accordance with the reluctance in said magnetic circuit.

4. A variable reluctance converter comprising a coded information member having alternate segments on one surface of different magnetic permeability, a magnetic readout head formed of high permeability material and having a plurality of spaced sensing elements integrally formed therein, each of said sensing elements including a recess with a finger formed therein, the end portions of said sensing elements being positioned in close proximity to said surface, said information member and said head being mounted for relative movement therebetween, means including a coil wound around said finger for generating flux in a magnetic circuit through said finger and the adjacent segment on said member and the peripheral portion of said head surrounding said finger for deriving an output which varies in accordance with the reluctance in said magnetic circuit.

5. An analog-to-digital converter including a rotatable disc having a plurality of tracks and a plurality of raised and recessed segments in each track, said disc being made of a material having relatively high permeability to magnetic flux, a sensing head having a flat surface positioned in close proximity to said disc and a plurality of openings through said flat surface and into said sensing head, said sensing head also having a plurality of fingers one in each of said openings and integral with the rest of said head at the bottom of said openings, said fingers being in individual radial alignment with said tracks of said disc, and means including a plurality of windings each supported on a different one of said fingers for generating a magnetic flux through said fingers and said disc to determine the angular position of said disc.

6. A magnetic read out head comprising a block of highly permeable material having a plurality of spaced sensing elements formed in one face thereof, each of said sensing elements including a peripheral portion forming a recess and a single finger centrally positioned within said recess, each of said fingers having a thin tip extending transversely across the outer ends thereof, said peripheral portion and said finger being integrally joined at their inner ends and substantially flush with said face of said block at their outer ends, an opening extending from an opposite face of said block into each of said recesses, and a coil of wire wound around each of said fingers and having leads extending out through said opening, said coil being adapted to be energized and generate magnetic flux in a circuit through said finger and said peripheral portion surrounding said finger.

7. An analog to digital converter including a rotatable disk having a plurality of tracks and a plurality of raised and recessed segments in each track, said disk being made of a material having relatively high permeability to magnetic flux, a sensing head having a flat surface positioned in close proximity to said disk and a plurality of openings through said flat surface and into said sensing head, said sensing head also having a plurality of fingers one in each of said openings and integral with the rest of said head at the bottom of said openings, said fingers each having a thin tip extending transversely across the outer ends thereof in radial alignment with the respective tracks on said disk, and means including a plurality of windings each supported on a different one of said fingers for generating magnetic flux in a circuit through said fingers and the proximate portion of said disk and back through the peripheral portion of said sensing head surrounding each of said fingers.

8. A variable reluctance converter comprising a coded information disk having a plurality of concentric tracks on one face thereof with alternate segments in each track of different magnetic permeability, a magnetic read-out head formed of high permeability material and having one face proximately opposed to said face of said disk and with a plurality of spaced sensing elements integrally formed therein, each of said sensing elements including a peripheral portion forming a recess and a single finger centrally positioned within said recess, each of said fingers having a thin tip extending transversely across the outer ends thereof and in radial alignment with one of said tracks, said peripheral portion and said finger being integrally joined at their inner ends and substantially flush with said face of said head at their outer ends, an opening extending from an opposite face of said block into each of said recesses, and means including a coil of wire wound around each of said fingers and having leads extending out through said openings for generating flux in a magnetic circuit through said finger and the adjacent segment of said member and the peripheral portion of said head surrounding said finger for deriving an output which varies in accordance with the reluctance in said magnetic circuit.

References Cited in the file of this patent

UNITED STATES PATENTS 2,794,851 Morris ---------------- June 4, 1957
2,915,593 Brown ---------------- Dec. 1, 1959

FOREIGN PATENTS 1,056,177 Germany ------------ Apr. 30, 1959